United States Patent
Dannhorn et al.

(10) Patent No.: US 7,402,668 B2
(45) Date of Patent: Jul. 22, 2008

(54) PROCESS OF PREPARING ALKYLHYDROXYALKYLCELLULOSE

(75) Inventors: Wolfgang Dannhorn, Soltau (DE); Erik-Andreas Klohr, Walsrode (DE); Martin Kowollik, Fallingbostel (DE); Hartwig Schlesiger, Fallingbostel (DE); Jörn-Bernd Pannek, Fallingbostel (DE)

(73) Assignee: Dow Wolff Cellulosics GmbH, Bomlitz (DE)

( * ) Notice: Subject to any disclaimer, the term of this patent is extended or adjusted under 35 U.S.C. 154(b) by 0 days.

(21) Appl. No.: 10/197,070

(22) Filed: Jul. 17, 2002

(65) Prior Publication Data

US 2003/0065165 A1    Apr. 3, 2003

(30) Foreign Application Priority Data

Jul. 20, 2001    (DE) ............... 101 35 464

(51) Int. Cl.
*C07H 1/00* (2006.01)
*C08B 11/08* (2006.01)
*C08B 11/02* (2006.01)
*C08B 1/00* (2006.01)

(52) U.S. Cl. .................. 536/124; 536/56; 536/84; 536/90; 536/91; 536/95; 536/96; 536/99; 536/100

(58) Field of Classification Search .............. 536/56, 536/84, 90, 91, 95, 96, 99, 100, 124
See application file for complete search history.

(56) References Cited

U.S. PATENT DOCUMENTS

| | | | | |
|---|---|---|---|---|
| 2,949,452 | A | | 8/1960 | Savage ........... 260/231 |
| 3,819,593 | A | * | 6/1974 | Glomski et al. ...... 526/200 |
| 3,839,319 | A | | 10/1974 | Greminger, Jr. et al. ... 260/231 |
| 4,096,325 | A | | 6/1978 | Teng et al. ............ 536/91 |
| 4,460,766 | A | * | 7/1984 | Felcht et al. ........... 536/84 |
| 4,477,657 | A | | 10/1984 | Strange et al. ......... 536/91 |
| 4,547,570 | A | * | 10/1985 | Garner ................. 536/84 |
| 4,650,863 | A | * | 3/1987 | Felcht et al. ........... 536/90 |
| 5,166,333 | A | | 11/1992 | Breckwoldt ............ 536/84 |
| 5,493,013 | A | | 2/1996 | Reichel ................ 536/84 |
| 6,235,893 | B1 | * | 5/2001 | Reibert et al. .......... 536/86 |
| 6,891,034 | B2 | * | 5/2005 | Dannhorn et al. ....... 536/84 |

2002/0038018 A1    3/2002 Dunnhorn et al. .......... 536/91

FOREIGN PATENT DOCUMENTS

DE    39 09 070    9/1990
EP    0 385 881    4/1998

OTHER PUBLICATIONS

Houben-Weyl, Methoden der Organischen Chemie, Makromolekulare Stoffe, 4th ed. vol. E20 (month unavailable) 1987, pp. 2042-2074, "Polysaccharid-Derivate", Dr. Konrad Engelskirchen.
Patent Abstracts Of Japan vol. 1998, No. 11, Sep. 30, 1998 & JP 10 158302 A Week 199834 Derwent Publications Ltd., GB; AN 1998-393478 Zusammenfassung.
JP 60 192702 A (Shinetsu Kagaku Kogyo KK), Oct. 1, 1985 Zusammenfassung & Database WPI Week 198545 Derwent Publications Ltd., London, GB; AN 1985-280998 Zusammenfassung.
G. Bartelmus and R. Keterer, Z. Anal. Chem 286 (1997) 161-190.

* cited by examiner

*Primary Examiner*—Shaojia Anna Jiang
*Assistant Examiner*—Everett White

(57) ABSTRACT

A process of preparing alkylhydroxyalkylcellulose (e.g., methylhydroxyethylcellulose and methylhydroxypropylcellulose) by reaction of cellulose in the presence of alkali metal hydroxide with an alkylating agent and a hydroxyalkylating agent is described. The process includes: (a) alkalizing cellulose by means of 0.9 to 2.9 equivalents of an alkali metal hydroxide I/AGU of the cellulose in the form of an aqueous alkali metal hydroxide solution, in the presence of a suspension medium containing at least 0.2 equivalents of an alkylating agent I/AGU of the cellulose; (b) reacting the alkalized cellulose of step (a) with alkylating agent I and a hydroxyalkylating agent at a temperature above 65° C.; (c) adding additional alkali metal hydroxide 11 in the form of an aqueous alkali metal hydroxide solution; and (d) adding additional alkylating agent 11 in an amount of at least the absolute value of the difference between (i) the number of equivalents of alkylating agent I/AGU of the cellulose already added, and (ii) the total number of equivalents of alkali metal hydroxide/AGU of the cellulose added. Additional alkylating agent 11 is not added in step (d) if (i) the number of equivalents of alkylating agent I/AGU of the cellulose already added exceeds (ii) the total number of equivalents of alkali metal hydroxide/AGU of the cellulose already added. In a further step (e), the alkylhydroxyalkylcellulose is isolated from the reaction mixture. The isolated alkylhydroxyalkylcellulose may be optionally purified.

7 Claims, No Drawings

PROCESS OF PREPARING ALKYLHYDROXYALKYLCELLULOSE

CROSS REFERENCE TO RELATED PATENT APPLICATION

The present patent application claims the right of priority under 35 U.S.C. §119 (a)-(d) of German Patent Application No. 101 35 464.9, filed Jul. 20, 2001.

FIELD OF THE INVENTION

The invention described here relates to a process for preparing alkylhydroxyalkylcelluloses, preferably methylhydroxyethylcellulose (MHEC) and methylhydroxypropylcellulose (MHPC), particularly preferably methylhydroxypropylcellulose having a defined DS (degree of substitution) by methyl groups and a defined MS (molar substitution) by hydroxyalkyl groups, preferably hydroxyethyl groups and hydroxypropyl groups, particularly preferably hydroxypropyl groups. The process of the invention allows a high chemicals yield and good reproducibility together with a broad variation of the structural product features partial and full substitution and of the molecular weight. The resulting products are, depending on the degree of substitution, water-soluble or soluble in organic solvents and can be used in various fields of application, for example as consistency regulators and processing aids in mineral and dispersion-based building material systems or in the production of cosmetic and pharmaceutical preparations.

BACKGROUND OF THE INVENTION

The highly varied class of cellulose ethers, including the group of binary alkylhydroxyalkylcelluloses including the commercially available representatives methylhydroxyethylcellulose (MHEC) and methylhydroxypropylcellulose (MHPC) has been a field of academic and industrial activity for a number of decades and has been widely described. An overview of the chemical fundamentals and principles of their preparation production processes and process steps) and a listing of materials and description of the products and possible applications of the various derivatives are given, for example, in Houben-Weyl, Methoden der Organischen Chemie, Makromolekulare Stoffe, $4^{th}$ edition, Volume E 20, p. 2042 (1987)

The processes described and employed for preparing alkylhydroxyalkylcelluloses, e.g., methylhydroxyethylcellulose and methylhydroxypropylcellulose, are based either on a heterogeneous reaction (multiphase reaction mixture) or homogeneous reaction (e.g. single-phase solution). The process itself can be carried out either batchwise or continuously. Heterogeneous reactions are additionally subdivided into gas-phase processes (without liquid reaction medium) and slurry processes (in the presence of a liquid reaction medium).

All process variants for preparing alkylhydroxyalkylcelluloses, e.g., methylhydroxyalkylcelluloses, which have been described and implemented industrially are generally based on the following chemical reaction scheme: In a preceding substep, the cellulosic starting material is activated, preferably by means of aqueous alkali metal hydroxide solution. The alkali metal salt of cellulose which is formed is subsequently reacted with the appropriate alkylene oxide and methyl chloride, with any excess alkali used advantageously being largely neutralized by superstoichiometric amounts of methyl chloride. In the subsequent purification step, salt formed and other by-products are separated off, preferably by washing with hot water.

DE-A 2402740, U.S. Pat. No. 2,949,452 and EP-A 134465 describe gas-phase processes for preparing MHPC in which no liquid or condensed media are present during the etherification reaction. In these processes, the substitution (DS and MS) can advantageously be varied over a wide range. However, as a result of the absence of a liquid heat transfer medium, the exothermic nature of the chemical reactions can not be satisfactorily controlled. In addition, distribution of alkali used and the reactants is a problem. This results in only a moderate level of reproducibility with regard to substitution, and in an uncontrolled and quite substantial decrease in the molecular weight, and thus a fluctuating property profile of the resulting products. In addition, high-viscosity products cannot be obtained by the gas-phase process because of the substantial degradation of the molecular weight.

The problems mentioned in the case of the gas-phase process occur to a much lesser extent, if at all, in the presence of a liquid reaction medium. In the slurry process, inert organic solvents, the reactant methyl chloride in excess or appropriate mixtures thereof usually function as the dispersion medium and heat transfer medium. The reaction medium which is present during the activation and reaction phase achieves, firstly, more uniform alkalization of the cellulose and better transport of the reactants into the alkali metal salts of the cellulose, more uniform substitution with higher reproducibility and chemical yield. Secondly, effective heat removal makes the process more readily controllable overall and significantly suppresses molecular weight degradation by avoidance of local overheating, so that even very high-viscosity products are obtainable. Owing to these process and product advantages, industrial production processes predominantly involve the use of a slurry process.

A disadvantage of the standard slurry process in which the total amounts of the reactants alkylene oxide and methyl chloride are present together during the etherification phase is the restricted ability to adjust the MS. For example, in the case of methylhydroxypropylcellulose, a formally parallel reaction of the reactants results in products having a high DS (methyl) and a low MS (hydroxypropyl). The converse product variant, i.e., a high MS (hydroxypropyl) and intermediate to low DS (methyl), is not obtainable in this type of process even by increasing the amount of propylene oxide employed because of the reaction kinetics. However, such highly propoxylated MC derivatives are of particular interest because of a series of substance-specific properties.

According to U.S. Pat. No. 4,096,325, highly propoxylated MC derivatives can be prepared when the hydroxypropylation and the methylation are carried out separately. As such a variant, EP-A 567869, for example, describes the stepwise reaction of the alkali metal salt of cellulose firstly with propylene oxide, and subsequently in a solvent with methyl chloride. In this way, the DS and the MS can be varied in a targeted manner over a wide range.

In the above-mentioned process variants with stepwise reaction, the hydroxypropylation is generally carried out at high temperatures. In contrast, the methylation, which is strongly exothermic per se, is carried out with cooling at relatively low temperatures. Owing to the long process times and the countercurrent energy flow, these processes have little industrial utility for economic reasons. In addition, increasing separation of the reaction steps results, in a manner similar to the gas-phase process, in problems with uniformity and reproducibility of the substitution, temperature control and molecular weight degradation (viscosity yield).

Owing to the abovementioned disadvantages of the process variants which have been developed and described to date, there is a continuing need for a process which combines the process engineering and product advantages and also the economic advantages of a slurry process with the flexibility of the gas-phase process in respect of achievability and proportion of the MS and DS over a wide range.

SUMMARY OF THE INVENTION

It is therefore an object of the invention to provide a process for preparing alkylhydroxyalkylcelluloses such as methylhydroxyethylcellulose and methylhydroxypropylcellulose which provides a high reproducibility and chemical yield and makes possible a broad variation of the MS and DS and of the product viscosities.

It has surprisingly been found that the products which have hitherto been obtainable only with difficulty in engineering and economic terms, or have not been obtainable at all, are obtained by a slurry process with comparatively little stoichiometric correction of the reaction system and at comparatively high reaction temperatures particularly in the hydroxyalkylating step.

The invention relates to an improved (compared to the prior art) process for preparing alkylhydroxyalkylcelluloses from cellulose and alkylating agents in the presence of alkali metal hydroxide solution and one or more suspension media and also for separating and purifying the reaction products, preferably by washing with hot water or with organic media.

In accordance with the present invention, there is provided a process of preparing alkylhydroxyalkylcellulose by reaction of cellulose in the presence of alkali metal hydroxide with an alkylating agent and a hydroxyalkylating agent, comprising:
 a) alkalizing cellulose by means of 0.9 to 2.9 equivalents of an alkali metal hydroxide I/AGU of said cellulose, the alkali metal hydroxide I being present as an aqueous alkali metal hydroxide solution, in the presence of a suspension medium containing at least 0.2 equivalents of an alkylating agent I/AGU of said cellulose;
 b) reacting the alkalized cellulose of step a) with said alkylating agent I and a hydroxyalkylating agent at a temperature above 65° C.;
 c) adding additional alkali metal hydroxide II in the form of an aqueous alkali metal hydroxide solution;
 d) adding additional alkylating agent II in an amount of at least the absolute value (i.e., a positive value) of the difference between (i) the number of equivalents of alkylating agent I/AGU of said cellulose already added, and (ii) the total number of equivalents of alkali metal hydroxide/AGU of said cellulose added,
  provided that additional alkylating agent II is not added if (i) the number of equivalents of alkylating agent I/AGU of said cellulose already added exceeds (ii) the total number of equivalents of alkali metal hydroxide (i.e., equivalents of alkali metal hydroxide I+equivalents of alkali metal hydroxide II)/AGU of said cellulose already added;
 e) isolating alkylhydroxyalkylcellulose from the reaction mixture; and
 f) optionally purifying the isolated alkylhydroxyalkylcellulose, wherein alkylating agents I and II may each be the same or different, and alkali metal hydroxides I and II may each be the same or different.

In accordance with the present invention, there is further provided a process of preparing methylhydroxyethylcellulose having a DS (M) of 1.6 to 2.2 and an MS (HE) of 0.02 to 1.2 comprising:
 (a) preparing a slurry of cellulose in a mixture of dimethyl ether and methyl chloride, the dimethyl ether being present in an amount of from 0.8 to 3 parts by weight per part by weight of cellulose, and the amount of methyl chloride being present in an amount of 2.1 to 7.2 equivalents/AGU of said cellulose;
 (b) alkalizing the cellulose by adding to the slurry of step (a) 1.3 to 2.7 equivalents of alkali metal hydroxide I, the alkali metal hydroxide I being in the form of an aqueous alkali metal hydroxide solution;
 (c) heating the mixture of step (b) to a temperature of 65 to 90° C. while simultaneously adding 0.02 to 1.5 equivalents of ethylene oxide/AGU of said cellulose;
 (d) adding, to the mixture of step (c), 0.8 to 2.9 equivalents of an alkali metal hydroxide II in the form of an aqueous alkali metal hydroxide solution;
 (e) isolating methylhydroxyethylcellulose having a DS (M) of 1.6 to 2.2 and an MS (HE) of 0.02 to 1.2 from the mixture of step (d); and
 (f) optionally purifying the isolated methylhydroxyethylcellulose.

In accordance with the present invention, there is yet further provided a process of preparing methylhydroxypropylcellulose having a DS (M) of 1.6 to 2.2 and an MS (HP) of 0.07 to 1.8 comprising:
 (a) preparing a slurry of cellulose in a mixture of dimethyl ether and methyl chloride I, the dimethyl ether being present in an amount of from 0.8 to 3 parts by weight per part by weight of cellulose, and the methyl chloride I being present in an amount of from 1.0 to 3.0 equivalents/AGU of said cellulose;
 (b) alkalizing the cellulose by adding to the slurry of step (a) 1.3 to 2.7 equivalents of alkali metal hydroxide I, the alkali metal hydroxide I being in the form of an aqueous alkali metal hydroxide solution;
 (c) heating the mixture of step (b) to a temperature of 65° C. to 90° C. while simultaneously adding 0.1 to 2.5 equivalents of propylene oxide/AGU of said cellulose;
 (d) adding, to the mixture of step (c), 1.1 to 4.2 equivalents of methyl chloride II/AGU of said cellulose, and 0.8 to 2.9 equivalents of alkali metal hydroxide II in the form of an aqueous alkali metal hydroxide solution;
 (e) isolating methylhydroxypropylcellulose having a DS (M) of 1.6 to 2.2 and an MS (HP) of 0.07 to 1.8 from the mixture of step (d); and
 (f) optionally purifying the isolated methylhydroxypropylcellulose.

Unless otherwise indicated, all numbers expressing quantities of ingredients, reaction conditions, etc. used in the specification and claims are to be under stood as modified in all instance by the term "about."

DETAILED DESCRIPTION OF THE INVENTION

As the key part of the improved, novel preparative process, cellulose is firstly alkalized (activated) in the presence of defined amounts and ratios of alkylating agent and suspension medium, partly etherified in a first phase by targeted addition of defined amounts of hydroxyalkylating agent and, in a second phase, further etherified by addition of a further defined amount of alkali metal hydroxide and, if necessary, alkylating agent.

A suitable starting material is cellulose in the form of wood pulp or cotton linters. In addition, it is also possible to use other polysaccharides such as guar, starch, etc. The solution viscosity of the etherification products can be varied over a wide range by appropriate choice of the polysaccharides. Preferred starting materials are milled wood pulp and milled linters cellulose or mixtures of these.

The alkalization (activation) of the polysaccharides is carried out using inorganic bases, preferably alkali metal hydroxides (e.g., alkali metal hydroxides I and/or II) in aqueous solution, e.g., sodium hydroxide and/or potassium hydroxide, preferably 35-60% strength sodium hydroxide solution, particularly preferably 48-52% strength sodium hydroxide solution.

As suspension medium, it is possible to use dimethyl ether (DME), $C_5$-$C_{10}$-alkanes such as cyclohexane or pentane, aromatics such as benzene or toluene, alcohols such as i-propanol or t-butanol, ketones such as butanone or pentanone, open-chain or cyclic ethers such as dimethoxyethane or 1,4-dioxane and also mixtures of the suspension media mentioned in varying ratios. A particularly preferred inert suspension medium is dimethyl ether (DME).

As alkylating agents (e.g., alkylating agents I and/or II), it is possible to use straight-chain or branched $C_1$-$C_6$-alkyl halides, if desired in admixture, in particular methyl chloride (MCL), ethyl chloride, ethyl bromide and propyl halides such as propyl iodide. Preference is given to methyl chloride and ethyl chloride; particular preference is given to methyl chloride. It is likewise possible to use alkylating reagents having ionic functions, e.g., monochloroacetic acid, N-(2-chloroethyl)diethylamine and vinylsulphonic acid.

Preferred hydroxyalkylating agents for introducing hydroxyalkyl groups are ethylene oxide (EO), propylene oxide (PO), butylene oxide (BO) and acrylonitrile. Particular preference is given to ethylene oxide. Bifunctional reagents, e.g., preferably dichloroethane or epichlorohydrin, can also be used to achieve gradually varying crosslinking of the cellulose ethers during the course of their preparation.

The process of the invention is employed for preparing binary, ternary and quaternary alkylhydroxyalkylcelluloses (AHACs), preferably for preparing the binary derivatives methylhydroxyethylcellulose (MHEC) and methylhydroxypropylcellulose (MHPC), particularly preferably for preparing methyl hydroxyethylcellulose.

In cellulose ether chemistry, the alkyl substitution is generally described with reference to DS values. The DS value is the mean number of substituted OH groups per anhydroglucose unit. The methyl substitution is reported, for example, as DS (methyl) or DS (M).

The hydroxyalkyl substitution is usually described with reference to MS values. The MS value is the mean number of moles of the etherification reagent which are bound in ether form per mole of anhydroglucose units (AGU) of the cellulose. Etherification by the etherification reagent ethylene oxide is reported, for example, as MS (hydroxyethyl) or MS (HE). Correspondingly, etherification by the etherification reagent propylene oxide is reported as MS (hydroxypropyl) or MS (HP).

The determination of the side groups is carried out by the Zeisel method (reference: G. Bartelmus and R. Kefterer, Z. Anal. Chem. 286 (1977) 161-190).

When the process is carried out in practice, milled or defibrated cellulose is generally placed in the reaction vessel under inert conditions. The cellulosic substrate is subsequently suspended in a mixture of, for example, DME/MCL I, with the weight ratio of DME/cellulose being from 4/1 to 0.4/1, preferably from 3/1 to 0.7/1 and particularly preferably from 2/1 to 0.8/1. The amount of MCL I in the first process step is at least 0.2 eq, where the unit "eq" represents the molar ratio of the respective starting material relative to anhydroglucose units (AGU) in the cellulose used. Preference is given to minimum eq of MCL I=eq of NaOH per AGU minus 1.4 and maximum eq of MCL I=eq of NaOH per AGU plus 6.5. The particularly preferred amount of MCL I in the first process step is: minimum eq of MCL I=eq of NaOH per AGU minus 1.0 and maximum eq of MCL I=eq of NaOH per AGU plus 4.5. The most preferred amount of MCL I in the first process step is: minimum eq of MCL I=eq of NaOH per AGU minus 0.5 and maximum eq of MCL I=eq of NaOH per AGU plus 3.5. The alkalization of the cellulose used is carried out using from 0.9 to 2.9 eq of NaOH per AGU, preferably from 1.3 to 2.7 eq of NaOH per AGU, particularly preferably from 1.7 to 2.5 eq of NaOH per AGU. The alkalization is generally carried out at temperatures of from 15 to 50° C., preferably about 40° C., for from 20 to 80 minutes, particularly preferably from 30 to 60 minutes. The NaOH is preferably used in the form of a 35-60 percent strength by weight aqueous solution, particularly preferably as 48-52% strength sodium hydroxide solution.

In an embodiment of the present invention the amount of alkyl halide present during the alkalizing step is calculated according to the following formula: (total number of equivalents alkali metal hydroxide per AGU of cellulose) to (total number of equivalents of alkali metal hydroxide per AGU of cellulose plus 4.5).

After the alkalization phase, the hydroxyalkylating agent, e.g. ethylene oxide (EO) in the case of the preparation of methylhydroxyethylcellulose, is added and the reaction is thermally forced by heating. The hydroxyalkylated agent can also be added during the heating phase. The reaction with the hydroxyalkylating agent (for example EO) and MCL I is preferably carried out at from 60 to 110° C., preferably from 65 to 90° C., particularly preferably from 75 to 85° C. The amount of hydroxyalkylating agent added is set in a targeted manner as a function of the desired degree of substitution. For the MHEC products customarily used at present in various applications, the amount of EO to be employed is from 0.02 to 1.5 eq per AGU, preferably from 0.05 to 1.0 eq per AGU, particularly preferably from 0.1 to 0.7 eq per AGU. In this way, MHECs having an MS (HE) of from 0.02 to 1.2, preferably an MS (HE) of from 0.03 to 0.8 and particularly preferably an MS (HE) of from 0.05 to 0.6 are prepared. For the MHPC products customarily used at present in various applications, the amount of PO to be employed is from 0.05 to 5 eq per AGU, preferably from 0.1 to 2.5 eq per AGU, particularly preferably from 0.2 to 1.6 eq per AGU. In this way, MHPCs having an MS (HP) of from 0.05 to 3.3, preferably an MS (HP) of from 0.07 to 1.8 and particularly preferably an MS (HP) of from 0.15 to 1.2, are prepared. The addition of the hydroxyalkylating agent to the reaction system can be carried out in a single addition step or in portions in a plurality of addition steps; preference is given to addition in one step, particularly preferably in a step directly subsequent to the alkalization phase.

After the first etherification phase and without significant cooling, a further amount of alkali metal hydroxide is added in the form of an aqueous solution. Preference is given to using NaOH in the form of a 35-60 percent strength by weight aqueous solution, particularly preferably as 48-52% strength sodium hydroxide solution. The amount of further NaOH used (NaOH II) is at least 0.2 eq per AGU and the total amount of alkali metal hydroxide used (NaOH tot.) is at least 1.5 eq per AGU. Preference is given to using from 0.5 to 5.0 eq of NaOH II per AGU as further addition; particular preference is given to using from 0.8 to 2.9 eq of NaOH II per AGU as further addition and greatest preference is given to using from 1.0 to 2.5 eq of NaOH II per AGU as further addition.

If the amount of alkylating agent I added in step a), e.g., MCL I, is not sufficient to achieve the desired methyl substitution, the first etherification phase is followed, without significant cooling, by addition of the amount MCL II required for the desired substitution by methyl groups, with this amount being characterized as follows: minimum eq of MCL II=eq of NaOH tot. minus eq of MCL I. Preference is given to using eq of MCL II=from 0 to 4.5 eq of MCL per AGU, particularly preferably eq of MCL II=from 0 to 2.5 eq of MCL per AGU. The addition of MCL II is carried out at a temperature above 65° C., preferably from 75 to 90° C., or at the temperature which prevails at the end of the hydroxyalkylation phase.

The portion MCL II can be added before, during or after the addition of the portion NaOH II. The portion MCL II can be introduced in a diluted state together with further suspension medium, preferably DME.

After the end of the second etherification phase, all volatile constituents are removed by distillation, if appropriate under reduced pressure. Purification, drying and milling of the resulting product are carried out by art-recognized methods used in cellulose derivative technology.

The following examples illustrate the invention and describe the resulting products, without restricting the scope of the invention:

EXAMPLES

In the following example, the unit 'eq' represents the molar ratio of the respective starting material relative to the anhydroglucose units (AGU) in the cellulose used.

Examples and Comparative Examples 1 to 6 (MHPC)

Under otherwise comparable conditions, the process of the invention gives products having significantly higher DS (M) values and significantly higher MS (HP) values (relative to the comparative examples) at the same amounts of raw material and of sodium hydroxide, methyl chloride and propylene oxide.

In a 5 l autoclave, 257 g of cotton linters (moisture: 5.2%; bulk in Cuen: 1728-1750 ml/g) are placed under inert conditions by evacuation and introduction of nitrogen. A mixture of 145 g of dimethyl ether and y eq of chloromethane is subsequently metered into the reactor. v eq of sodium hydroxide in the form of a 50% strength by weight aqueous sodium hydroxide solution are subsequently sprayed onto the cellulose while stirring. After the material has been stirred for another 60 minutes at 25° C., 0.8 eq of propylene oxide is metered into the reactor and the mixture is heated to 85° C. After the material has been stirred for 120 minutes at 85° C., w eq of sodium hydroxide in the form of a 50% strength by weight aqueous sodium hydroxide solution are metered in at this temperature. The mixture is subsequently reacted at 85° C. for another 120 minutes and then cooled. The volatile constituents are distilled off and the reactor is evacuated.

The crude product is washed twice with hot water, subsequently dried and milled.

The degree of substitution by methyl groups (DS-M), the degree of substitution by hydroxypropyl groups (MS-HP) and the viscosity (V1) in a 1% strength aqueous solution (D=2.55s$^{-1}$, 20° C., rotation viscometer) of the hydroxypropylmethylcellulose ethers obtained in this way are listed in Table 1. The NaCl content of all products was<0.1%.

TABLE 1

| Example | v | w | v + w | Y | DS (M) | MS (HP) | V1 | Comp./ according to the invention |
|---|---|---|---|---|---|---|---|---|
| 1 | 2.6 | 0 | 2.6 | 4.33 | 1.55 | 0.24 | 14,000 | C |
| 2 | 2.0 | 0.6 | 2.6 | 4.33 | 1.60 | 0.27 | 6500 | I |
| 3 | 2.9 | 0 | 2.9 | 4.63 | 1.61 | 0.20 | 14,000 | C |
| 4 | 2.0 | 0.9 | 2.9 | 4.63 | 1.68 | 0.25 | 5000 | I |
| 5 | 3.5 | 1.5 | 3.5 | 5.23 | 1.75 | 0.16 | 13,700 | C |
| 6 | 2.0 | 1.5 | 3.5 | 5.23 | 1.78 | 0.21 | 5700 | I |

Examples and Comparative Examples 7 to 12 (MHPC)

Under otherwise comparable conditions, the process of the invention gives products having significantly higher DS (M) values and significantly higher MS (HP) values (relative to the comparative examples) at the same amounts of raw material and of sodium hydroxide, methyl chloride and propylene oxide.

In a 5 l autoclave, 257 g of cotton linters (moisture: 5.2%; bulk in Cuen: 1750 ml/g) are placed under inert conditions by evacuation and introduction of nitrogen. A mixture of x g of dimethyl ether and y eq of chloromethane is subsequently metered into the reactor. v eq of sodium hydroxide in the form of a 50% strength by weight aqueous sodium hydroxide solution are subsequently sprayed onto the cellulose while stirring. After the material has been stirred for another 60 minutes at 25° C., 0.8 eq of propylene oxide is metered into the reactor and the mixture is heated to 85° C. After the material has been stirred for 120 minutes at 85° C., w eq of sodium hydroxide in the form of a 50% strength by weight aqueous sodium hydroxide solution and z eq chloromethane are metered into the reactor at this temperature. The mixture is subsequently reacted at 85° C. for another 120 minutes and then cooled. The volatile constituents are distilled off and the reactor is evacuated.

The crude product is washed twice with hot water, subsequently dried and milled.

The degree of substitution by methyl groups (DS-M), the degree of substitution by hydroxypropyl groups (MS-HP) and the viscosity (V1) in a 1% strength aqueous solution (D=2.55s$^{-1}$, 20° C., rotation viscometer) of the hydroxypropylmethylcellulose ethers obtained in this way are listed in Table 2. The NaCl content of all products was<0.1%.

TABLE 2

| Example | v | w | v + w | x | y | z | y + z | DS (M) | MS (HP) | V1 | Comp./ according to the invention |
|---|---|---|---|---|---|---|---|---|---|---|---|
| 7 | 2.3 | 0 | 2.3 | 173 | 1.87 | 2.16 | 4.03 | 1.40 | 0.36 | 7200 | C |
| 8 | 2.0 | 0.3 | 2.3 | 145 | 1.57 | 2.46 | 4.03 | 1.45 | 0.41 | 9200 | I |
| 9 | 2.9 | 0 | 2.9 | 229 | 2.47 | 2.16 | 4.63 | 1.54 | 0.27 | 6400 | C |
| 10 | 2.0 | 0.9 | 2.9 | 145 | 1.57 | 3.06 | 4.63 | 1.70 | 0.40 | 9600 | I |
| 11 | 3.2 | 0 | 3.2 | 257 | 2.77 | 2.16 | 4.93 | 1.57 | 0.24 | 7900 | C |
| 12 | 2.0 | 1.2 | 3.2 | 145 | 1.57 | 3.36 | 4.93 | 1.78 | 0.42 | 11,100 | I |

Examples and Comparative Examples 13 to 22 (MHPC)

Under otherwise comparable conditions, the process of the invention gives products having significantly higher DS (M) values (relative to Comparative Examples 20 to 22) and significantly higher MS (HP) values (relative to Comparative Examples 13 to 14) at the same amounts of raw material and of propylene oxide.

In a 5 l autoclave, 254-257 g of cotton linters (moisture: 4.2-5.2%; bulk in Cuen: 1750 ml/g) are placed under inert conditions by evacuation and introduction of nitrogen. A mixture of x g of dimethyl ether and y eq of chloromethane is subsequently metered into the reactor. v eq of sodium hydroxide in the form of a 50% strength by weight aqueous sodium hydroxide solution are subsequently sprayed onto the cellulose while stirring. After the material has been stirred for another 60 minutes at 25° C., 0.8 eq of propylene oxide is metered into the reactor and the mixture is heated to 85° C. After the material has been stirred for 120 minutes at 85° C., w eq of sodium hydroxide in the form of a 50% strength by weight aqueous sodium hydroxide solution and z eq of chloromethane are metered into the reactor at this temperature. The mixture is subsequently reacted at 85° C. for another 120 minutes and then cooled. The volatile constituents are distilled off and the reactor is evacuated.

The crude product is washed twice with hot water, subsequently dried and milled.

The degree of substitution by methyl groups (DS-M), the degree of substitution by hydroxypropyl groups (MS-HP) and the viscosity (V1) in a 1% strength aqueous solution (D=2.55s$^{-1}$, 20° C., rotation viscometer) of the hydroxypropylmethylcellulose ethers obtained in this way are listed in Table 3. The NaCl content of all products was<0.1%.

Examples and Comparative Examples 23 to 28 (MHPC)

Under otherwise comparable conditions, the process of the invention gives products having significantly higher DS (M) values (relative Comparative Examples 27 to 28) and significantly higher MS (HP) values (relative to Comparative Example 23) at the same amounts of raw material and of ethylene oxide and propylene oxide.

In a 5 l autoclave, 257 g of cotton linters (moisture: 5.2%; bulk in Cuen: 1750 ml/g) are placed under inert conditions by evacuation and introduction of nitrogen. A mixture of x g of dimethyl ether and y eq of chloromethane is subsequently metered into the reactor. v eq of sodium hydroxide in the form of a 50% strength by weight aqueous sodium hydroxide solution are subsequently sprayed onto the cellulose while stirring. After the material has been stirred for another 60 minutes at 25° C., 0.8 eq of propylene oxide is metered into the reactor and the mixture is heated to 85° C. After the material has been stirred for 120 minutes at 85° C., w eq of sodium hydroxide in the form of a 50% strength by weight aqueous sodium hydroxide solution are metered in to the reactor at this temperature. The mixture is subsequently reacted at 85° C. for another 120 minutes and then cooled. The volatile constituents are distilled off and the reactor is evacuated.

The crude product is washed twice with hot water, subsequently dried and milled.

The degree of substitution by methyl groups (DS-M), the degree of substitution by hydroxypropyl groups (MS-HP) and the viscosity (V1) in a 1% strength aqueous solution (D=2.55s$^{-1}$, 20° C., rotation viscometer) of the hydroxypropylmethylcellulose ethers obtained in this way are listed in Table 4. The NaCl content of all products was<0.1%.

TABLE 3

| Example | v | w | v + w | x | Y | z | y + z | DS (M) | MS (HP) | V1 [mPas] | Comp./ according to the invention |
|---|---|---|---|---|---|---|---|---|---|---|---|
| 13 | 3.5 | 0 | 3.5 | 287 | 3.1 | 2.13 | 5.23 | 1.77 | 0.26 | 14,800 | C |
| 14 | 3.0 | 0.5 | 3.5 | 241 | 2.6 | 2.63 | 5.23 | 1.78 | 0.31 | 12,100 | C |
| 15 | 2.5 | 1.0 | 3.5 | 194 | 2.1 | 3.13 | 5.23 | 1.81 | 0.37 | 12,300 | I |
| 16 | 2.0 | 1.5 | 3.5 | 148 | 1.6 | 3.63 | 5.23 | 1.81 | 0.41 | 11,700 | I |
| 17 | 1.5 | 2.0 | 3.5 | 102 | 1.1 | 4.13 | 5.23 | 1.83 | 0.50 | 6800 | I |
| 18 | 1.2 | 2.3 | 3.5 | 74 | 0.8 | 4.43 | 5.23 | 1.71 | 0.54 | 5500 | I |
| 19 | 1.0 | 2.5 | 3.5 | 56 | 0.6 | 4.63 | 5.23 | 1.77 | 0.57 | 7700 | I |
| 20 | 0.8 | 2.7 | 3.5 | 37 | 0.4 | 4.83 | 5.23 | 1.62 | 0.54 | 4400 | C |
| 21 | 0.6 | 2.9 | 3.5 | 19 | 0.2 | 5.03 | 5.23 | 1.52 | 0.62 | 2100 | C |
| 22 | 0.4 | 3.1 | 3.5 | 0 | 0 | 5.23 | 5.23 | 1.44 | 0.55 | sediment | C |

TABLE 4

| Example | v | w | v + w | x | Y | DS (M) | MS (HP) | V1 [mPas] | Comparative/according to the invention |
|---|---|---|---|---|---|---|---|---|---|
| 23 | 3.5 | 0 | 3.5 | 287 | 5.23 | 1.75 | 0.12 | 13,100 | C |
| 24 | 2.5 | 1.0 | 3.5 | 194 | 5.23 | 1.77 | 0.19 | 7200 | I |
| 25 | 1.5 | 2.0 | 3.5 | 102 | 5.23 | 1.73 | 0.22 | 1800 | I |
| 26 | 1.2 | 2.3 | 3.5 | 74 | 5.23 | 1.71 | 0.24 | 3200 | I |
| 27 | 0.8 | 2.7 | 3.5 | 37 | 5.23 | 1.55 | 0.23 | sediment | C |
| 28 | 0.4 | 3.1 | 3.5 | 0 | 5.23 | 1.64 | 0.20 | sediment | C |

Examples and Comparative Examples 29 and 30 (HEHPMC)

Under otherwise comparable conditions, the process of the invention gives a product having significantly higher MS (HE) and MS (HP) values at the same amount of raw material and of ethylene oxide and propylene oxide.

In a 5 l autoclave, 254-257 g of cotton linters (moisture: 4.2%; bulk$_{Cuen}$: 1750 ml/g) are placed under inert conditions by evacuation and introduction of nitrogen. A mixture of 201 g of dimethyl ether and y eq of chloromethane is subsequently metered into the reactor. v eq of sodium hydroxide in the form of a 50% strength by weight aqueous sodium hydroxide solution are subsequently sprayed onto the cellulose while stirring. After the material has been stirred for another 60 minutes at 25° C., 0.6 eq of propylene oxide and 0.4 eq of ethylene oxide are metered into the reactor and the mixture is heated to 85° C. After the material has been stirred for 120 minutes at 85° C., w eq of sodium hydroxide in the form of a 50% strength by weight aqueous sodium hydroxide solution are metered into the reactor at this temperature. The mixture is subsequently reacted at 85° C. for another 120 minutes and then cooled. The volatile constituents are distilled off and the reactor is evacuated.

The crude product is washed twice with hot water, subsequently dried and milled.

The degree of substitution by methyl groups (DS M), the degree of substitution by hydroxyethyl groups (MS HE), the degree of substitution by hydroxypropyl groups (MS HP) and the viscosity (V2) in 2% strength aqueous solution (D=2.55s$^{-1}$, 20° C., rotation viscometer) of the hydroxyethylhydroxypropylmethylcellulose ethers obtained in this way are listed in Table 6. The NaCl content of all products was<0.1%.

TABLE 6

| Example | v | w | v + w | y | DS (M) | MS (HP) | MS (HE) | V2 [mPas] | Comparative/according to the invention |
|---|---|---|---|---|---|---|---|---|---|
| 29 | 2.6 | 0 | 2.6 | 4.33 | 1.50 | 0.16 | 0.17 | 71,000 | C |
| 30 | 1.0 | 1.6 | 2.6 | 4.33 | 1.53 | 0.21 | 0.32 | 22,800 | I |

Examples and Comparative Examples 31 and 32 (HEHPMC)

Under otherwise comparable conditions, the process of the invention gives a product having significantly higher MS (HE) and MS (HP) values at the same amount of raw material and of ethylene oxide and propylene oxide.

In a 5 l autoclave, 254 g of cotton linters (moisture: 4.2%; bulk$_{Cuen}$: 1750 ml/g) are placed under inert conditions by evacuation and introduction of nitrogen. A mixture of 201 g of dimethyl ether and y eq of chloromethane is subsequently metered into the reactor. v eq of sodium hydroxide in the form of a 50% strength by weight aqueous sodium hydroxide solution are subsequently sprayed onto the cellulose while stirring. After the material has been stirred for another 60 minutes at 25° C., 0.6 eq of propylene oxide and 0.4 eq of ethylene oxide are metered into the reactor and the mixture is heated to 85° C. After the material has been stirred for 120 minutes at 85° C., w eq of sodium hydroxide in the form of a 50% strength by weight aqueous sodium hydroxide solution and z eq of chloromethane are metered into the reactor at this temperature. The mixture is subsequently reacted at 85° C. for another 120 minutes and then cooled. The volatile constituents are distilled off and the reactor is evacuated.

The crude product is washed twice with hot water, subsequently dried and milled.

The degree of substitution by methyl groups (DS M), the degree of substitution by hydroxyethyl groups (MS HE), the degree of substitution by hydroxypropyl groups (MS HP) and the viscosity (V2) in 2% strength aqueous solution (D=2.55s$^{-1}$, 20° C., rotation viscometer) of the hydroxyethylhydroxypropylmethylcellulose ethers obtained in this way are listed in Table 7. The NaCl content of all products was<0.1%.

TABLE 7

| Example | V | w | v + w | y | z | y + z | DS (M) | MS (HP) | MS (HE) | V2 [mPas] | Comp./according to the invention |
|---|---|---|---|---|---|---|---|---|---|---|---|
| 31 | 2.6 | 0 | 2.6 | 2.17 | 2.16 | 4.33 | 1.52 | 0.26 | 0.26 | 70,400 | C |
| 32 | 1.0 | 1.6 | 2.6 | 0.60 | 3.73 | 4.33 | 1.59 | 0.37 | 0.31 | 38,100 | I |

Examples 33 and 34 (HBHPMC)

Under otherwise comparable conditions, the process of the invention gives a product having significantly higher MS (HP) and MS (HB) values at the same amount of raw material and of propylene oxide and butylene oxide.

In a 5 l autoclave, 254 g of cotton linters (moisture: 4.2%; bulk$_{Cuen}$: 1750 ml/g) are placed under inert conditions by evacuation and introduction of nitrogen. A mixture of 201 g of dimethyl ether and y eq of chloromethane is subsequently metered into the reactor. v eq of sodium hydroxide in the form of a 50% strength by weight aqueous sodium hydroxide solution are subsequently sprayed onto the cellulose while stirring. After the material has been stirred for another 60 minutes at 25° C., 0.5 eq of butylene oxide and 0.5 eq of propylene oxide are metered into the reactor and the mixture is heated to 85° C. After the material has been stirred for 180 minutes at 85° C., w eq of sodium hydroxide in the form of a 50% strength by weight aqueous sodium hydroxide solution and z eq of chloromethane are metered into the reactor at this temperature. The mixture is subsequently reacted at 85° C. for another 120 minutes and then cooled. The volatile constituents are distilled off and the reactor is evacuated.

The crude product is washed twice with hot water, subsequently dried and milled.

The degree of substitution by methyl groups (DS M), the degree of substitution by hydroxybutyl groups (MS HB), the degree of substitution by hydroxypropyl groups (MS HP) and the viscosity (V2) in 2% strength aqueous solution (D=2.55s$^{-1}$, 20° C., rotation viscometer) of the hydroxybutylhydroxypropylmethylcellulose ethers obtained in this way are listed in Table 8. The NaCl content of all products was <0.1%.

TABLE 8

| Example | v | w | v + w | y | z | y + z | DS (M) | MS (HP) | MS (HB) | V2 [mPas] | Comp./ according to the invention |
|---|---|---|---|---|---|---|---|---|---|---|---|
| 33 | 2.6 | 0 | 2.6 | 2.17 | 2.16 | 4.33 | 1.55 | 0.22 | 0.20 | 68,700 | C |
| 34 | 1.0 | 1.6 | 2.6 | 0.6 | 3.73 | 4.33 | 1.52 | 0.37 | 0.34 | 42,200 | I |

Examples and Comparative Examples 35 and 36 (MHEC)

Under otherwise comparable conditions, the process of the invention gives a comparable product at a significantly lower amount of raw material and of ethylene oxide.

In a 400 l autoclave, 28.6 kg of wood pulp (moisture: 4.8%; bulk in Cuen: 1245 ml/g) and 7.0 kg of wood pulp (moisture: 3.1%; bulk in Cuen: 826-937 ml/g) are placed under inert conditions by evacuation and introduction of nitrogen. A mixture of 65.8 kg of dimethyl ether and y eq of chloromethane is subsequently metered into the reactor. v eq of sodium hydroxide in the form of a 50% strength by weight aqueous sodium hydroxide solution are subsequently sprayed onto the cellulose over a period of about 15 minutes while stirring, with the temperature rising from 33° C. to about 40° C. After the material has been stirred for another 35 minutes, during which time the temperature rises further from 40° C. to about 50° C., u eq of ethylene oxide are metered into the reactor over a period of about 16 minutes while heating the mixture to 64° C. After the material has been stirred at 64° C for 30 minutes, it is heated to 80° C. over a period of 25 minutes. Over a further period of 15 minutes, it is heated to 84° C. At this temperature, w eq of sodium hydroxide in the form of a 50% strength by weight aqueous sodium hydroxide solution are metered in. The mixture is reacted for a further 65 minutes at about 86° C. The volatile constituents are distilled off and the reactor is evacuated.

The crude product is washed twice with hot water, subsequently dried and milled.

The degree of substitution by methyl groups (DS-M), the degree of substitution by hydroxyethyl groups (MS HE) and the viscosity (V2) in 2% strength aqueous solution (D=2.55s$^{-1}$, 20° C., rotation viscometer) of the hydroxyethylmethylcellulose ethers obtained in this way are listed in Table 9. The NaCl content was 1.4-2.7% for all products.

TABLE 9

| Example | y | v | w | v + w | u | DS (M) | MS (HE) | V2 [mPas] | Comp./ according to the invention |
|---|---|---|---|---|---|---|---|---|---|
| 35 | 6.2 | 4.2 | 0 | 4.2 | 0.31 | 1.95 | 0.11 | 27,050 | C |
| 36 | 6.2 | 2.2 | 2.0 | 4.2 | 0.19 | 1.92 | 0.11 | 27,860 | I |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing alkylhydroxyalkylcellulose comprising the steps of:

(a) alkalizing cellulose with 0.9 to 2.9 equivalents of alkali metal hydroxide/AGU in a suspension medium containing alkyl halide, wherein said alkyl halide is present in an amount from that at least equivalent to the equivalents of alkali metal hydroxide present to an amount at most equivalent to the equivalents of alkali metal hydroxide present plus 4.5 equivalents, and wherein said alkali metal hydroxide is in the form of an aqueous alkali metal hydroxide solution;

(b) adding hydroxyalkylating agent to the alkalized cellulose of step (a) at a temperature above 65° C. to form a reaction mixture;

(c) adding alkali metal hydroxide to the reaction mixture of step (b), wherein said alkali metal hydroxide is in the form of an aqueous alkali metal hydroxide solution;

(d) isolating alkylhydroxyalkylcellulose from the reaction mixture of step (c) and optionally purifying said alkylhydroxyalkylcellulose.

2. The process according to claim 1, wherein said suspension medium is dimethyl ether.

3. The process according to claim 1, wherein said alkylating agent is an alkyl halide selected from the group consisting of methyl chloride, ethyl chloride, ethyl bromide, propyl iodide and mixtures thereof.

4. The process according to claim 1, wherein said hydroxyalkylating agent comprises one or more alkylene oxides selected from the group consisting of ethylene oxide, propylene oxide, and butylene oxide.

5. The process according to claim 1, wherein steps (b), (c), and (d) are performed at a temperature in the range from 65 to 110° C.

6. The process according to claim 1, wherein the alkylhydroxyalkylcellulose prepared is methylhydroxypropylcellulose or methylhydroxyethylcellulose.

7. A process for preparing methylhydroxyethylcellulose having a DS (M) of 1.6 to 2.2 and an MS (HE) of 0.02 to 1.2 comprising the steps of:
  (a) preparing a slurry of cellulose in a mixture of dimethyl ether and methyl chloride, wherein said dimethyl ether being present in an amount from 0.8 to 3.0 parts by weight per part by weight of cellulose, and wherein said methyl chloride is present in an amount from 2.1 to 7.2 equivalents/AGU of said cellulose;
  (b) alkalizing the cellulose slurry of step (a) by adding to said cellulose slurry 1.3 to 2.7 equivalents of alkali metal hydroxide I to form a mixture, wherein said alkali metal hydroxide I is in the form of an aqueous alkali metal hydroxide solution;
  (c) heating the mixture of step (b) to 65 to 90° C. while adding 0.02 to 1.5 equivalents ethylene oxide/AGU of said cellulose;
  (d) adding to the mixture of step (c) 0.8 to 2.9 equivalents of an alkali metal hydroxide II, wherein said alkali metal hydroxide II is in the form of an aqueous alkali metal hydroxide solution;
  (e) isolating methylhydroxyethylcellulose having a DS (M) of 1.6 to 2.2 and an MS (HE) of 0.02 to 1.2 from the mixture of step (d); and
  (f) optionally purifying the isolated methylhydroxyethylcellulose.

* * * * *